Figure 1:
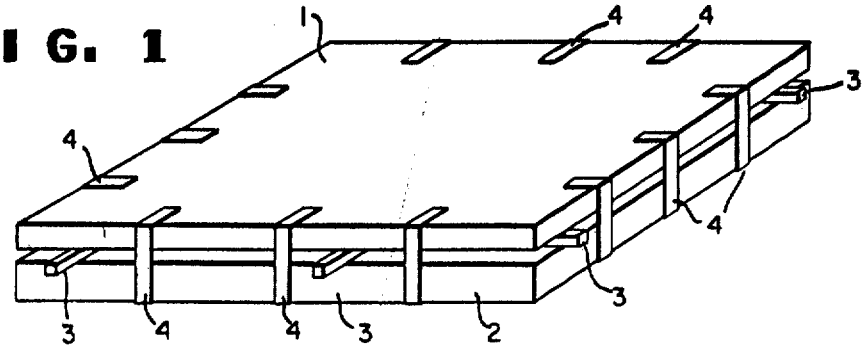
Figure 2:
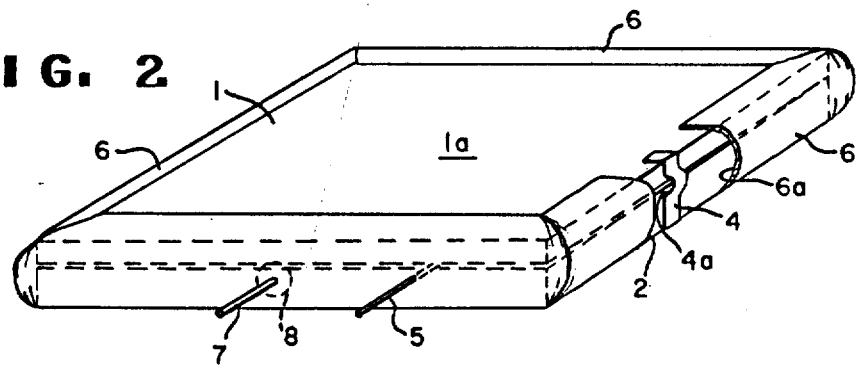
Figure 3:
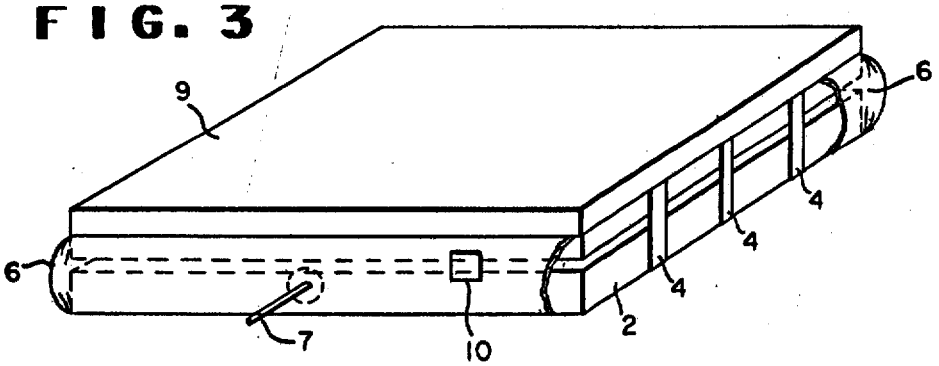

228-109

FIP7907

SR

OR T 857,048

DEC 24 1968

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 24, 1968

857 O.G. 1040

T 857,048

707,522

COMPRESSED GAS STANDOFF FOR CLADDING

William F. Sharp, Jr., Bellmawr Manor, Apt. 39, Bellmawr, N.J. 08030

Filed Feb. 23, 1968. Published Dec. 24, 1968

Class 29—497.5

1 Sheet Drawing. 8 Pages Specification

FIG. 3

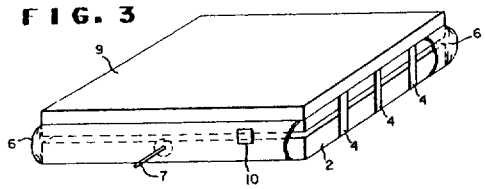

Standoff required between metal layers to be explosion-bonded, e.g., as in U.S. Patent 3,137,937, is provided by introducing pressurized gas between the layers. To illustrate, the backer is supported in horizontal position, and several spacers whose thickness is equal to the desired standoff are placed on the backer around its edges. The cladder is lowered onto these spacers. Spaced standoff strips of strong adhesive tape are stretched taut across the standoff gap and adhered to the edges and outside surface of each layer. A thin spacer is rested on the backer at one edge, and the other spacers are removed, slackening the standoff strips and allowing the cladder to rest on the backer and thin spacer (permits gas to enter between the layers). The standoff gap is completely enclosed, e.g., with wide strips of vinyl tape which extend outside the standoff strips and adhere to each layer's outside surface. Explosive is placed on the cladder, and pressurized gas, e.g., air or nitrogen, is introduced through a tube inserted through the tape seal, forcing the layers apart until the standoff strips become taut. The layers are now at the desired standoff, and the explosive is initiated.

228-109 SR

FIP7907 OR T 857,048

INVENTOR

WILLIAM F. SHARP, JR.

BY F. A. Burrows Jr.

ATTORNEY